US012792406B2

(12) United States Patent
Vaezi et al.

(10) Patent No.: US 12,792,406 B2
(45) Date of Patent: Nov. 10, 2026

(54) SYSTEMS AND METHODS FOR SCALING COMPUTATIONAL-WORKFLOWS TO DISPARATE EXECUTION ENGINES VIA ENGINE-AGNOSTIC COMPUTATIONAL-WORKFLOW ENGINE RECOMMENDATIONS

(71) Applicant: Capital One Services, LLC, McLean, VA (US)

(72) Inventors: Payam Vaezi, McLean, VA (US); Brian Newman, McLean, VA (US); David Harrington, Gibsonia, PA (US); Ankur Ankur, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 204 days.

(21) Appl. No.: 18/772,008

(22) Filed: Jul. 12, 2024

(65) Prior Publication Data

US 2026/0017103 A1 Jan. 15, 2026

(51) Int. Cl.
*G06F 9/50* (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

| | | | | |
|---|---|---|---|---|
| 9,207,984 | B2 * | 12/2015 | Sivasubramanian | G06F 9/5011 |
| 10,740,656 | B2 * | 8/2020 | Arora | H04B 7/18508 |
| 12,039,559 | B2 * | 7/2024 | Cella | B25J 9/1682 |
| 12,141,670 | B2 * | 11/2024 | Lopatecki | G06F 18/2113 |
| 12,498,680 | B2 * | 12/2025 | Cella | G05B 13/0265 |
| 12,585,231 | B2 * | 3/2026 | Cella | B25J 9/161 |
| 12,664,505 | B2 * | 6/2026 | Cella | G06Q 10/06375 |

* cited by examiner

*Primary Examiner* — Van H Nguyen
(74) *Attorney, Agent, or Firm* — Foley & Lardner LLP

(57) ABSTRACT

In some embodiments, reducing usage of computational resources associated with scaling computational-workflows to disparate execution engines via engine-agnostic computational-workflow engine recommendations may be facilitated. In some embodiments, the system receives a computational-workflow configured to execute within a first computational-workflow environment. The system then determines a set of operational dependencies for the computational workflow. The system then generates a feature vector comprising the set of operational dependencies to be inputted into a machine learning model configured to generate a first recommendation indicating a second computational-workflow environment to execute the first computational-workflow. The system may receive the first recommendation from the machine learning model, and deploy the first computational-workflow within the second computational-workflow environment.

20 Claims, 4 Drawing Sheets

400

SYSTEMS AND METHODS FOR SCALING COMPUTATIONAL-WORKFLOWS TO DISPARATE EXECUTION ENGINES VIA ENGINE-AGNOSTIC COMPUTATIONAL-WORKFLOW ENGINE RECOMMENDATIONS

BACKGROUND

In recent years, the use of artificial intelligence, including, but not limited to, machine learning, deep learning, etc. (referred to collectively herein as artificial intelligence models, machine learning models, or simply models) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence may rely on large amounts of high-quality data. The process for obtaining this data and ensuring it is high-quality can be complex and time-consuming. Additionally, data that is obtained may need to be categorized and labeled accurately, which can be difficult, time-consuming and a manual task. Second, despite the mainstream popularity of artificial intelligence, practical implementations of artificial intelligence may require specialized knowledge to design, program, and integrate artificial intelligence-based solutions, which can limit the amount of people and resources available to create these practical implementations. Finally, results based on artificial intelligence can be difficult to review as the process by which the results are made may be unknown or obscured. This obscurity can create hurdles for identifying errors in the results, as well as improving the models providing the results. These technical problems may present an inherent problem with attempting to use an artificial intelligence-based solution in providing engine-agnostic computational-workflow engine recommendations.

SUMMARY

Methods and systems are described herein for novel uses and/or improvements to artificial intelligence applications. As one example, methods and systems are described herein for reducing usage of computational resources associated with scaling computational-workflows to disparate execution engines via engine-agnostic computational-workflow engine recommendations.

Workflow engines, commonly referred to as workflow orchestration tools, may provide software developers and data scientists with an environment to execute a workflow without the need to continuously monitor the workflow once deployed. Workflows themselves may refer to a set of operations, tasks, activities, or processes that are orchestrated together to achieve an intended goal or output. Workflow engines may facilitate the flow of information, tasks, events, or other operations within the given workflow. For example, workflow engines may verify process statuses, handle errors, protect integrity of the workflow, provide workflow testing, automate routine tasks, or other operations. However, due to the nature of each workflow engine providing its own execution environment (e.g., to execute a given workflow), each workflow architecture and workflow operation/process must be written in a computing language that matches that of the workflow engine itself. When a software developer or data scientist attempts to port a workflow to a new workflow engine/environment, the software developer or data scientist must re-write the workflow in a language that conforms to that of the new workflow engine, thereby causing workflow downtime and increasing the amount of computational resources required to test, execute, and deploy such workflows.

Furthermore, due to the unpredictability in which operations may be added to a given workflow, data scientists and software developers are often limited to the features present within a given workflow engine. For example, while a developer may select a given workflow engine based on the current needs of the workflow, when new operations or processes are added, the current workflow engine may be inadequate (e.g., as the current workflow engine does not have a specific feature keyed to a new operation or process that another workflow engine has). As such, the developer must rewrite the entire workflow into a computing language acceptable to the new workflow engine, further exacerbating the problem of workflow downtime.

Moreover, as an entity (e.g., an organization, software developer, company) may utilize multiple workflow engines for different workflows, the entity must select the best or most efficient workflow engine to execute a given workflow. Selecting the best or most efficient workflow engine often is embedded in the developer's knowledge and understanding of such workflow engines. When multiple development teams operating within a given entity exist, a given developer may not know which workflow engines are currently available for fast deployment of their workflow. This factor may influence selecting a workflow engine as engines that are currently operating for an entity are well understood and currently set up to interact with the operational components of workflows that the entity has already created. While using multiple workflow engines may provide developers and scientists like a wide variety of options, due to the large amount of design choices to consider, developers may inadvertently choose the "wrong" workflow engine, only to need to re-write the entire workflow for a better suited workflow engine. Additionally, due to the wide variety of options, developers may miss out on the chance to reuse already created operational components of a workflow, thereby wasting computational resources involved in re-creating workflows.

To overcome these technical deficiencies, methods and systems disclosed herein provide a mechanism for reducing computational resources associated with scaling computational-workflows to disparate execution engines via engine-agnostic computational-workflow engine recommendations. For example, the system may first determine a set of operational dependencies for a given workflow based on the architecture of the workflow and a set of operations of the workflow. The operational dependencies may include requirements that the given workflow needs to execute, what data sources are required, data schemas that are accepted by the operational components or modules of the workflow, what features are needed from a workflow engine, the architecture of the given workflow, or other computational dependencies. The system may then generate a feature vector comprising the set of operational dependencies and an identifier associated with a first computational-workflow engine that is executing the given workflow to be provided as input to a machine learning model. The machine learning model may be trained on historical computational-workflows executed within disparate computational-workflow engines associated with a given entity in order to provide recommendations as to other workflow engines that the entity uses and that are compatible with the currently designed (e.g., given workflow). In this way, the system may determine the most efficient workflow engine to execute the workflow that is not only based on whether the entity already has access to the workflow engine, but also whether the currently designed workflow engine includes features that the workflow (i) requires, (ii) is compatible with, and (iii) includes similar workflow components as to other workflows the entity already has access to—thereby reducing the amount of computational resource associated with scaling computational-workflows.

The system may then input the generated feature vector to the machine learning model to generate a first recommendation indicating a second computational-workflow engine to execute the given workflow. The system may then deploy the given computational-workflow to the second (e.g., recommended) computational-workflow engine. For example, as the machine learning model is trained on historical computational-workflows that are associated with the given entity (e.g., workflows that the entity has access to), the recommendation reflects a workflow engine that are (i) compatible with the given workflow and (ii) that the entity currently has access to (e.g., set up, running, etc.). In this way, the system may reduce the amount of computational resources associated with scaling the given workflow as the workflow need not be reconfigured to execute on an alternative workflow that the entity does not currently use or has access to, while decreasing workflow downtime (e.g., as the recommended workflow engine is already executing other workflows).

In some aspects, the system receives a computational-workflow comprising a set of operations that are coordinated to be performed based on a execution trigger of an operation, wherein the computational-workflow is configured to execute within a first computational-workflow environment. The system determines a set of operational dependencies for the computational-workflow based on (i) an architecture of the computational-workflow and (ii) the set of operations. The system then generates a feature vector comprising the set of operational dependencies and an identifier associated with the first computational-workflow environment to be inputted into a machine learning model configured to generate a first recommendation indicating a second computational-workflow environment to execute the first computational-workflow. The system may receive the first recommendation from the machine learning model indicating the second computational-workflow environment to execute the first computational-workflow, and may then deploy the first computational-workflow within the second computational-workflow environment.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
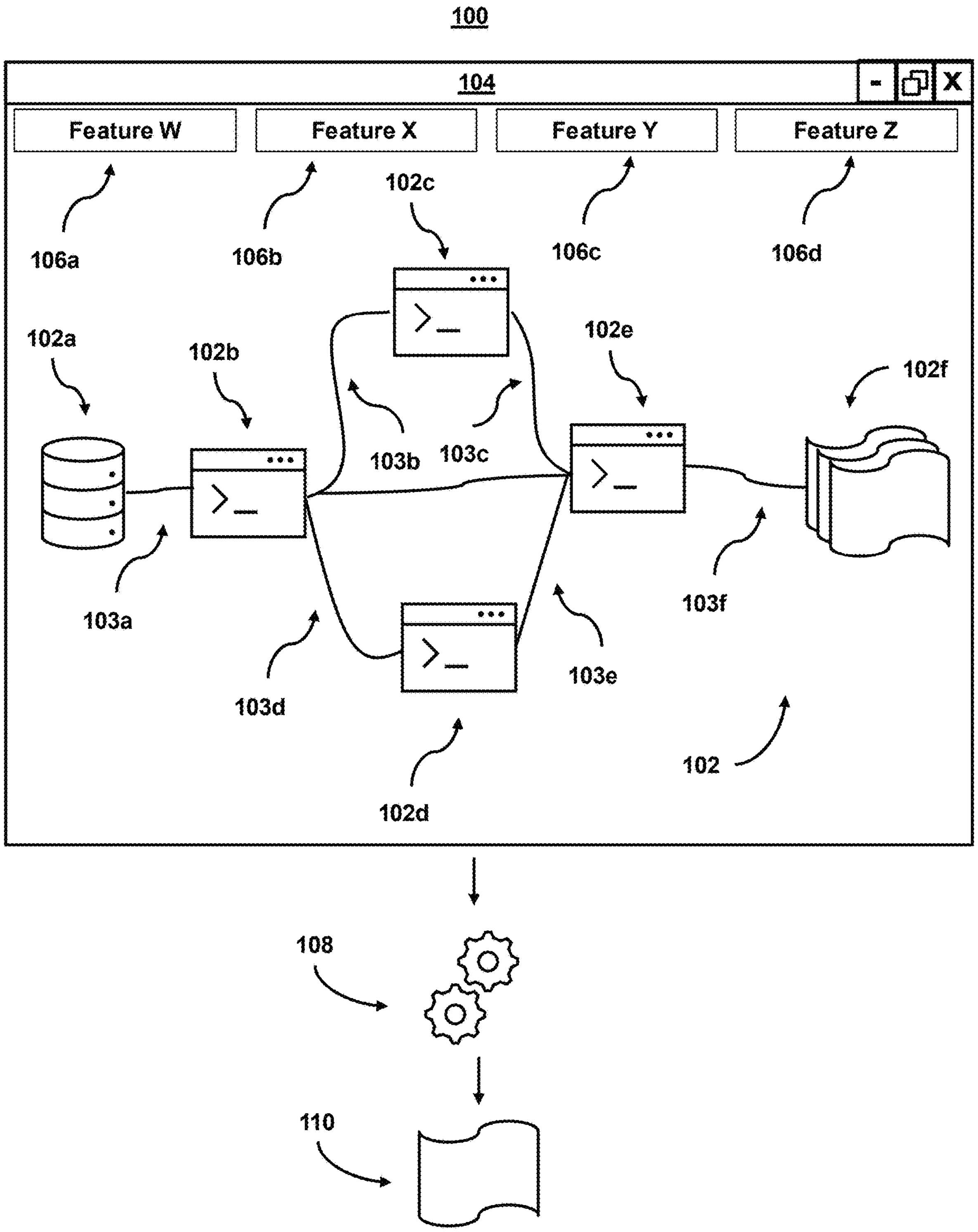
FIG. 1 shows an illustrative diagram for providing engine-agnostic computational-workflow engine recommendations, in accordance with one or more embodiments.

FIG. 1 shows an illustrative diagram for providing engine-agnostic computational-workflow engine recommendations, in accordance with one or more embodiments. For example, recommendation system 100 may indicate a computational-workflow environment recommendation system. For example, FIG. 1 illustrates a computational-workflow 102 hosted within a computational-workflow environment 104, a logical component 108, and outputs 110. The computational-workflow 102 may include one or more computational-workflow operations 102*a*-102*f*. For example, computational-workflow operations 102*a*-102*f* may refer to one or more operations, data sources (e.g., databases, storages, inputs, etc.), processes, outputs, alerts, triggers, Application Programming Interfaces (APIs), or other components that make up, compose, or otherwise define a computational-workflow. Computational-workflow 102 may also include one or more links 103*a*-103*f*. In some embodiments, links 103*a*-103*f* may be directional (e.g., where one operation provides output data as input data to another operation). In other embodiments, links 103*a*-103*f* may be non-directional (e.g., where one operation is communicatively linked to another operation to exchange data).

Computational-workflow 102 may be hosted within computational-workflow environment 104. For example, computational-workflow environment 104 may be an environment in which the computational-workflow executes in. The computational-workflow environment may be a workflow-engine configured to coordinate, orchestrate, monitor, provide resources to, or facilitate one or more processes/operations of the computational-workflow 102. Computational-workflow environment 104 may include one or more computational-workflow features 106*a*-106*d*. For example, computational workflow features 106*a*-106*d* may refer to features provided by the computational-workflow environment 104. As different computational-workflow environments may each have their own unique set of features that are offered (e.g., to connect to given data sources, effectuate one or more processes, test the workflow, etc.), a user may select a computational-workflow environment based on the features that the computational-workflow environment offers. As illustrated in FIG. 1, computational-workflow environment 104 may offer computational-workflow features 106*a*-106*d*.

Recommendation system 100 may provide computational-workflow 102 and computational-workflow environment 104 information to logical component 108 to generate output 110. For example, logical component 108 may be a logical component configured to generate one or more computational-workflow environment recommendations, computational-workflows (e.g., generated computational workflows based on an original computational-workflow, a translated computational-workflow, a different version of a computational workflow, etc.), feature vectors, operational dependencies (e.g., of the computational workflow), or other outputs as outputs 110. Logical component 108, for example, may be a computer program that is processed with respect to one or more components of FIG. 3.

Using the components of recommendation system 100, a recommendation may be generated that is based on the computational-workflow 102, the computational-workflow environment 104, and other information, to reduce the usage of computational resources when scaling computational-workflows to disparate execution engines. For example, due to the nature of each workflow environment providing its own set of features, being written in a given computing language, and their given uses within an entity's computing system, selecting a workflow environment to execute (or otherwise host) a workflow may be challenging. Such challenges arise as developers may be unaware of existing workflow environments that are currently configured to process similar workflows. This may cause developers to select a less suitable workflow environment to orchestrate operations of a given workflow when other, more suitable, workflow environments are available and already configured to execute a workflow that the developer has created-thereby causing a waste in computational resources (e.g., computer memory and processing power) utilized when setting up a "new" workflow environment. Moreover, when developers configure a "new" workflow environment that is already in use by the entity, such configuration may contribute to workflow downtime as efforts to set up the "new" workflow environment are duplicated (e.g., when the "new" workflow environment is currently configured to process workflows and developers are simply unaware of the workflow environment already being configured to interact with components of the entity's computing system). Therefore, by providing logical component 108 with the computational-workflow 102, the computational-workflow environment 104, and other related workflow information, logical component 108 may analyze the computational-workflow and the environment in which the computational-workflow is to be executed within to provide a recommendation as to the most suitable computational-workflow environment that the computational-workflow should be executed in. By doing so, the system may recommend the most suitable and efficient workflow environment to execute the workflow in.

The system may be used to generate recommendations indicating computational-workflow environments to execute a computational-workflow. In disclosed embodiments, a computational-workflow may include set of operations, tasks, activities, or processes that are coordinated together to achieve an intended goal or output. In some embodiments, a computational-workflow may include a sequence of operations that passes from initiation to completion. In some embodiments, a computational-workflow may comprise an order of operations, tasks, activities, or processes that occur in a particular order. In some embodiments, a computational-workflow may comprise a data pipeline. In some embodiments, a computational-workflow may comprise portions of executable code that process data at various points in time in a given order that pass the processed data to other portions of executable code. In some embodiments, a computational-workflow may comprise data sources (e.g., databases, data lakes, etc.), software, APIs, machine learning models, or other components that process data in a given order.

In disclosed embodiments, a computational-workflow environment may include an environment in which computational-workflows are executed or hosted within. In some embodiments, a computational-workflow environment may comprise a computing environment that facilitates the flow of information, tasks, events, or other operations within a workflow (e.g., computational-workflow). In some embodiments, a computational-workflow environment may comprise features that may verify process statuses, handle errors, protect integrity of the workflow, provide workflow testing, automate routine tasks, or provide other features that are related to workflows. In some embodiments, a computational-workflow environment may provide features that are related to workflows, but are not part of the workflow itself. In some embodiments, a computational-workflow environment may be a workflow engine configured to execute a workflow.

The system may be used to generate an updated computational-workflow. In disclosed embodiments, an updated computational-workflow may be a computational-workflow that is updated to include one or more additional operations, tasks, activities, or processes that was not originally present in a prior version of the computational-workflow. In some embodiments, the updated computational-workflow may be a workflow that is written in a different computing language than that of the original workflow. In some embodiments, the updated computational-workflow may be a workflow that is written in a computing language that corresponds to the computing language of a given computational-workflow environment. For example, the system may translate a computational-workflow of one computing language for a given computational-workflow environment to a second computing language for another computational-workflow environment.

Figure 2:
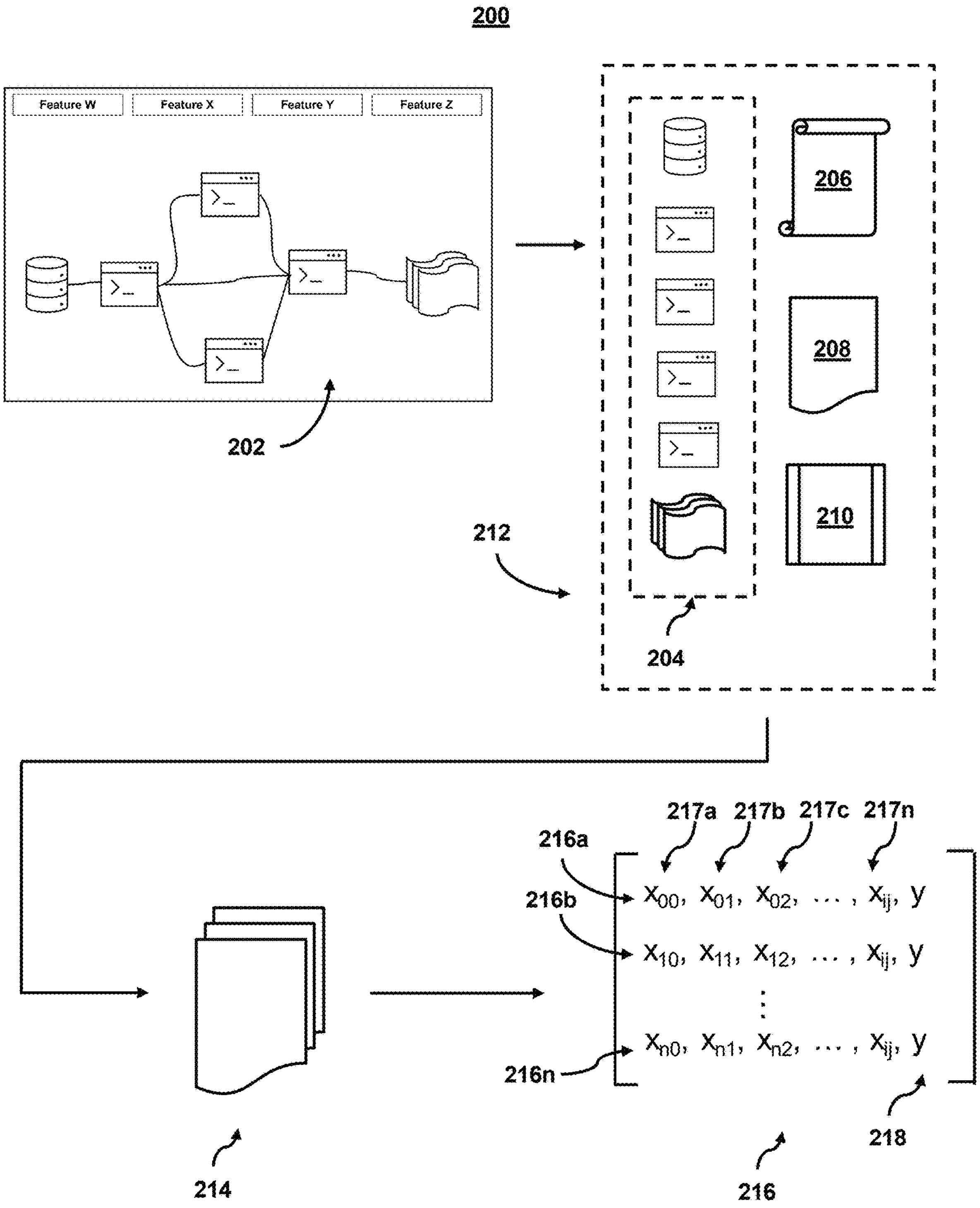
FIG. 2 shows an illustrative diagram for generating a feature vector, in accordance with one or more embodiments.

FIG. 2 shows an illustrative diagram for generating a feature vector, in accordance with one or more embodiments. For example, FIG. 2 shows a first workflow hosted in a first workflow environment 202, extracted operations 204, architecture information 206, environment information 208, additional information 210, operation dependency source information 212, operational dependencies 214, and a feature vector 216. First workflow hosted in the first workflow environment 202 may represent a computational-workflow that is hosted in a computational-workflow environment. In some embodiments, the computational-workflow and the computational-workflow environment depicted in first workflow hosted in the first workflow environment 202 may be the same as or similar to computational-workflow 102 hosted within a computational-workflow environment 104, respectively (FIG. 1). The system may extract information from the first computational workflow hosted in the first workflow environment 202 to generate extracted operations 204, architecture information 206, environment information 208, additional information 210, operation dependency source information 212. For example, the extracted information may be used to generate operational dependencies 214, which in turn, is used to generate feature vector 216.

Extracted operations 204 may be operations that are included within the first workflow hosted in the first workflow environment 202. For example, extracted operations 204 may include data-related to the operations of the workflow, such as the data sources involved in the workflow, the processes performed on the data of the workflow, the inputs, outputs, or other information of the workflow. Each operation of extracted operations 204 may include metadata associated with the operation. For example, the metadata may include input specifications, output specifications, computational resource requirements, execution constraints, priority values, identifiers, ownership information, versioning information, entity information, parameter values, threshold values, operation location information (e.g., IP addresses, URLs, etc.), or other information associated with an operation of the computational-workflow. Architecture information 206 may include information related to the architecture of the computational-workflow. For example, architecture information 206 may comprise information pertaining to the flow of information of the computational workflow. For instance, architecture information 206 may be information defining an order which operations of the computational workflow are to be executed, which operations provide information as input to other operations of the workflow, a sequence of operations, or other architecture-related information.

Environment information 208 may be information that is associated with the environment in which the first workflow hosted in the first workflow environment 202 is hosted in. For example, environment information 208 may indicate a set of features that the first workflow environment provides. As described above, the set of features may be features such as verification processes, error handling, system protection measures, workflow integrity processes, workflow testing, automation features, notification generation, security protocols, scheduling mechanisms, compliance mechanisms, automated scaling of workflows, or other features. Additional information 210 may include information that pertains to an entity associated with the first workflow hosted in the first workflow environment 202. For example, in some embodiments, additional information 210 may include workflow environment identifiers (e.g., computational-workflow identifiers, computational-workflow engine identifiers) that the entity currently or historically has access to (or has otherwise configured). For instance, as the first workflow hosted in the first workflow environment 202 may be associated with an entity, the system may obtain additional information 210 from a computing system associated with the entity to supplement the information extracted directly from the first workflow hosted in the first workflow environment 202.

In disclosed embodiments, operation dependency source information 212 may comprise the extracted operations 204, architecture information 206, environment information 208, additional information 210. For example, operation dependency source information 212 may be the collective of the extracted operations 204, architecture information 206, environment information 208, additional information 210. In this way, the system may aggregate information to be analyzed when generating one or more recommendations or computational-workflows. The operation dependency source information 212 may be used to generate operational dependencies 214. For example, operational dependencies 214 may be a set of operational dependencies that correspond to each operation of a set of operations of first workflow hosted in the first workflow environment 202. For instance, the system may perform one or more parsing processes, identification processes, extraction processes, or retrieval processes on the operation dependency source information 212 to obtain a set of operational dependencies for each operation of the set of operations of the first workflow hosted in the first workflow environment 202. For instance, operational dependencies 214 may include requirements that each operation of a given workflow needs to execute, what data sources are required, data schemas that are accepted by the operational components or modules of the workflow, what features are needed from a workflow engine, the architecture of the given workflow, or other computational dependencies.

The system may use operational dependencies 214 to generate a feature vector 216. For example, the system can use one or more embedding models (e.g., Word2Vec, BERT, GloVe, FastText, SIMCSE, GTE, E5, etc.) to provide a normalized embedding of the operational dependencies 214. Leveraging the embedding of the operational dependencies 214, the system can generate feature vector 216 indicating the set of operational dependencies 214. Feature vector 216 may be an n-dimensional feature vector. For example, the dimensionality of feature vector 216 may be based on (i) a number of operations associated with first workflow hosted in the first workflow environment 202, (ii) a number of operational dependencies of operational dependencies 214, or (iii) a number of environment identifiers (e.g., of the computational-workflow environment that the computational-workflow is hosted in).

As illustrated in FIG. 2, feature vector 216 comprises rows and columns. Each row may indicate an operation-specific operational dependency set **216*a*-216*n* and each column may indicate an operational dependency 217*a*-217*n* as well as environment identifier 218. For example, operation-specific operational dependency set 216*a*-216*n* may be a representation of operational dependencies for the operations of the first workflow hosted in the first workflow environment 202. Operational dependency 216*a*-217*n* may indicate a particular operational dependency of the operation-specific operational dependency set 216*a*-216*n*. For example, first operation-specific operational dependency set 216*a* may include first operational dependency 217*a*, second operational dependency 217*b*, third operational dependency 217*c*, . . . , n-operational dependency 217*n* (e.g., where n is an integer), and environment identifier 218. For instance, the rows of feature vector 216 may correspond to an operation of the first workflow hosted in the first workflow environment 202, and the columns of feature vector 216 may correspond to a given type of operational dependency of the respective operation (e.g., of the first workflow hosted in the first workflow environment 202) and the environment identifier associated with the first workflow hosted in the first workflow environment 202. By generating a feature vector reflecting the operational dependencies of the first workflow hosted in the first workflow environment 202**, the system may reduce the amount of information to be processed (e.g., by a machine learning model) to generate one or more recommendations as opposed to processing the textual information associated with the operational dependencies. Additionally, in this way, the system may generate a unique feature vector that captures the relevant information needed to generate recommendations as to which computational-workflow environment is best suited for a given computational-workflow-thereby reducing the likelihood of wasted computational resources stemming from inefficient configurations and deployments of workflows to unsuitable workflow environments.

Figure 3:
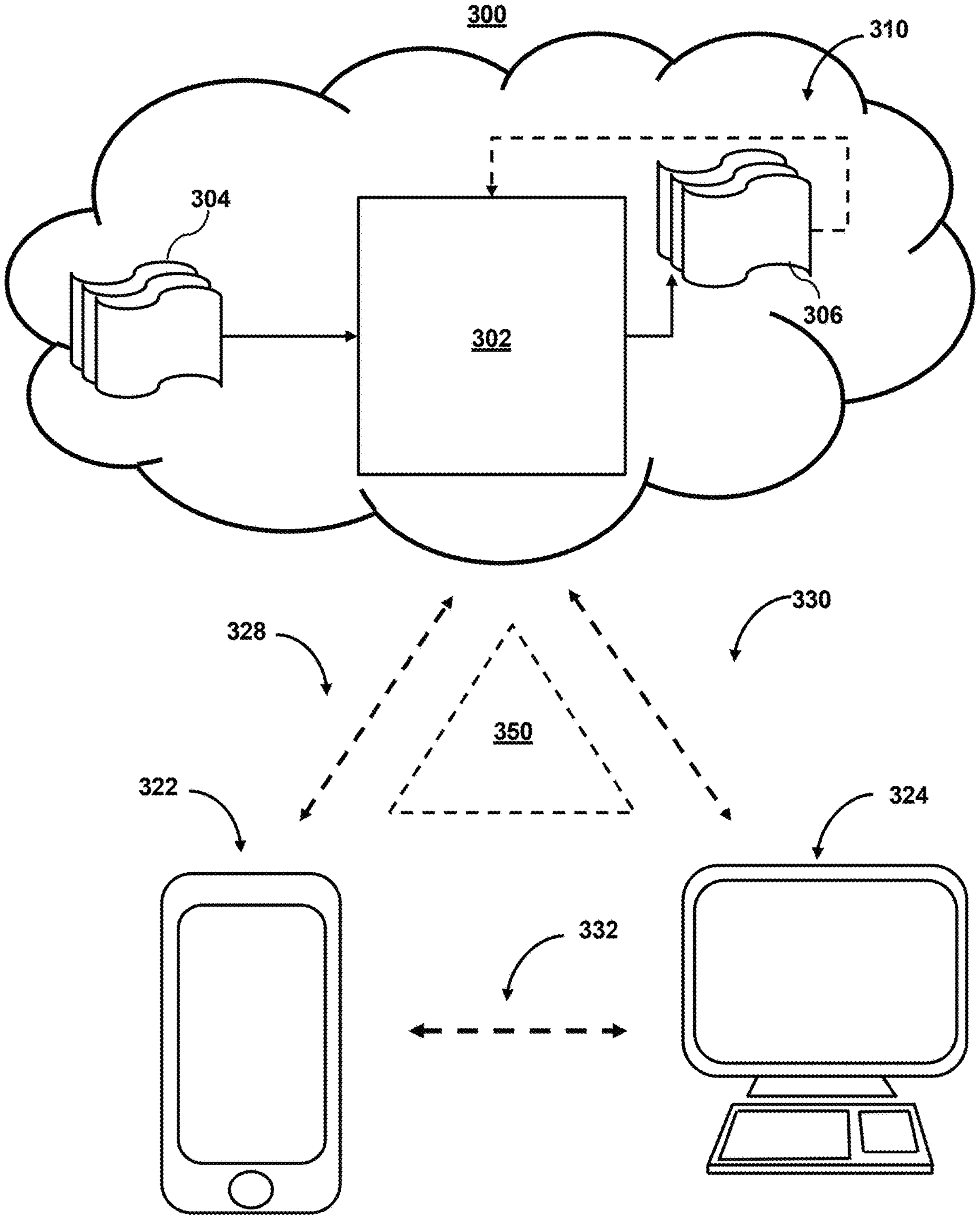
FIG. 3 shows illustrative components for a system used to reduce usage of computational resources associated with scaling computational-workflows to disparate execution engines via engine-agnostic computational-workflow engine recommendations, in accordance with one or more embodiments.

FIG. 3 shows illustrative components for a system used to reduce usage of computational resources associated with scaling computational-workflows to disparate execution engines, in accordance with one or more embodiments. For example, FIG. 3 may show illustrative components for providing engine-agnostic computational-workflow engine recommendations. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may have neither user input interfaces nor displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include logical component 108 (FIG. 1) for generating computational-workflow environment recommendations, computational-workflows (e.g., generated computational workflows based on an original computational-workflow, a translated computational-workflow, a different version of a computational workflow, etc.), feature vectors, operational dependencies (e.g., of the computational workflow), or other outputs.

Cloud components 310 may access entity information data sources (e.g., a database associated with an entity of one or more components of FIG. 2), historical computational-workflow environment information (e.g., identifiers of computational-workflow environments that the entity has access to, has configured, or has deployed computational workflows to in the past), machine learning model databases, embedding models, pre-determined code portions (e.g., used to translate a computational-workflow of one language into another language), user databases (e.g., to identify computational-workflow environments that are associated with a given user of the system), computational-workflow versioning information, or other information.

Cloud components 310 may include model 302, which may be a machine learning model, artificial intelligence model, etc. (which may be referred collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction (e.g., a computational-workflow environment, a computational-workflow engine).

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, back propagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302 (e.g., a computational-workflow environment, a computational-workflow engine).

In some embodiments, the model (e.g., model 302) may automatically perform actions based on outputs 306. In some embodiments, the model (e.g., model 302) may not perform any actions. The output of the model (e.g., model 302) may be used to identify which computational-workflow environment to deploy a computational-workflow to, which computational-workflow environment to host a computational-workflow in, determine whether a computational-workflow needs to be translated into a different computing language associated with the computational-workflow environment that the computational-workflow is to be executed in, to automatically translate the computational-workflow into another computing language, perform an update process on the model, to retrain the model, or other actions.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End and Back-End. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API Platforms and their modules. API layer 350 may use a developer portal. API layer 350 may use strong security constraints applying WAF and DDOS protection, and API layer 350 may use RESTful APIs as standard for external integration.

Figure 4:
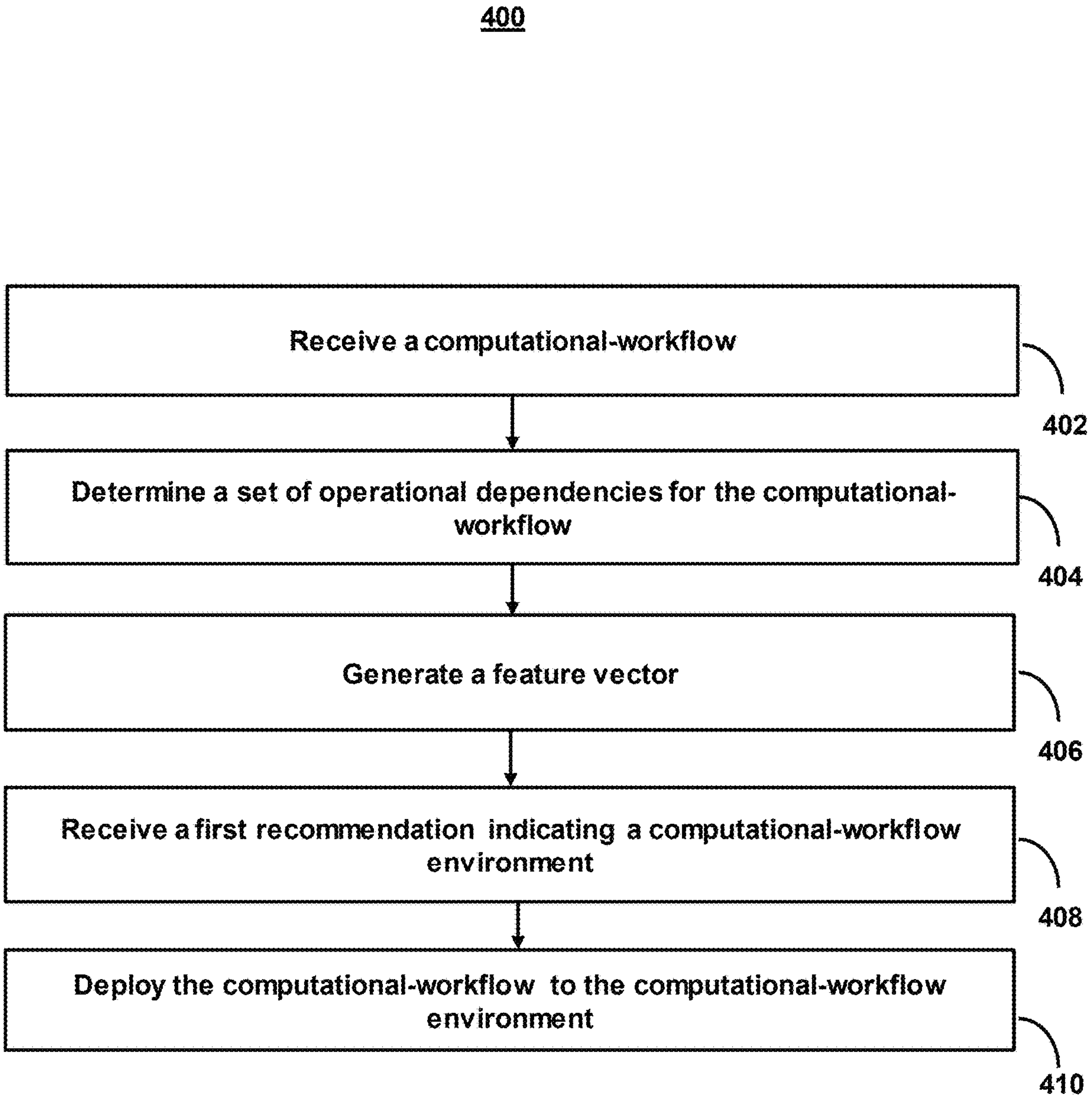
FIG. 4 shows a flowchart of the steps involved in reducing usage of computational resources associated with scaling computational-workflows to disparate execution engines via engine-agnostic computational-workflow engine recommendations, in accordance with one or more embodiments.

FIG. 4 shows a flowchart of the steps involved in reducing usage of computational resources associated with scaling computational-workflows to disparate execution engines, in accordance with one or more embodiments. For example, the system may use process 400 (e.g., as implemented on one or more system components described above) in order to provide engine-agnostic computational-workflow engine recommendations.

At step 402, process 400 (e.g., using one or more components described above) receives a computational-workflow. For example, the system may receive a computational-workflow comprising a set of operations that are coordinated to be performed based on an execution trigger of an operation, where the computational-workflow is configured to execute within a first computational-workflow environment. The computational-workflow (e.g., a workflow) may include a set of operations that are coordinated to execute based on the execution of other operations that are part of the computational-workflow. For example, similar to a data pipeline, one or more operations of the workflow may execute based on the completion of one or more other operations that are part of the workflow. The computational-workflow may execute operations based on a trigger (e.g., the completion of one or more operations, tasks, activities, jobs, etc.), a user-provided input, a schedule, or other execution trigger. In some embodiments, the computational-workflow may process data in a particular order. For instance, a first operation of the computational workflow may process input data at a first time, and a second operation of the computational workflow may process input data at a second time. The first and second times may be the same time, or different times, in accordance with one or more embodiments. The operations of the computational workflow may process input data to generate an output. In some embodiments, the output of one operation of the computational-workflow may be provided as input to another operation of the computational-workflow.

In some embodiments, the computational-workflow may be configured to execute within a computational-workflow environment that is associated with an entity. For example, the entity can be a company, business, developer, user, or other entity. In one use case, the entity can be a company that processes live social media feed information to generate one or more notifications. For example, the entity may configure a workflow to determine whether a product of the entity is experiencing an error by using a workflow that extracts social media status updates from a social media service provider, performs natural language processing on the status updates, and generates a notification if it is determined that the product of the entity is experiencing an error. However, it should be noted that any computational-workflow may be executed, and that such example is merely illustrative. The workflow (e.g., computational-workflow) may execute within a computational-workflow environment. For example, the computational-workflow environment may be a workflow orchestration tool, workflow engine, computing environment, or other workflow service to which workflows may be executed within. In some embodiments, the computational-workflow environment may be associated with the entity. For example, the entity may have the computational-workflow environment configured to interact with one or more data sources, software modules, software components, APIs, servers, or other components of a computing system that the entity controls or is otherwise associated with. In this way, the computational-workflow may access the necessary components to process information within a computational-workflow environment.

At step 404, process 400 (e.g., using one or more components described above) determines a set of operational dependencies for the computational-workflow. For example, the system may determine a set of operational dependencies for the computational-workflow based on (i) an architecture of the computational-workflow and (ii) the set of operations. For instance, the system may extract the set of operations from the computational-workflow, and determine, for each operation of the set of operations, a set of operational dependencies for the computational-workflow. As each operation of the set of operations of the computational-workflow may include metadata of the operation, the system may first extract the operations from the computational-workflow to access the metadata of each operation. The system may also analyze the architecture of the computational-workflow to determine the flow of information of the computational-workflow. For example, the architecture of the computational-workflow may refer to the order in which operations of the computational-workflow are executed. For instance, operations of the computational-workflow may be connected to each other via one or more links.

Referring to FIG. 1, links 103*a*-103*f* may indicate the architecture of the computational-workflow 102. In some embodiments, links 103*a*-103*f* may be directional (e.g., where one operation provides output data as input data to another operation). For example, first operation 102*a* may provide output data as input to second operation 102*b* via first link 103*a*. In other embodiments, links 103*a*-103*f* may be non-directional (e.g., where one operation is communicatively linked to another operation to exchange data). For example, second operation 102*b* may be communicatively linked to third operation 102*c* via second link 103*b*. In some embodiments, the architecture of the computational-workflow 102 may be stored in a database as metadata separate from the metadata of the operations 102*a*-102*f*. However, in other embodiments, the architecture of the computational-workflow 102 may be stored as metadata in association with the operations 102*a*-102*f* themselves.

The system may determine a set of operational dependencies for each operation of the set of operations using (i) the architecture of the computational-workflow and (ii) the set of operations. For example, by determining the set of operational dependencies for the workflow in its entirety (e.g., by considering each and every operation of the computational-workflow and the architecture of the computational-workflow), the system may determine a baseline of requirements that the computational-workflow needs to effectively execute-thereby enabling more accurate computational-workflow environment recommendations to be generated that are based on the totality of the computational-workflow. Moreover, by determining the set of operational dependencies for the computational-workflow, the system enhances computational-workflow environment recommendations as the recommendations may be based on computational requirements/computational resource needs as opposed to an intended purpose of the computational workflow-thereby further advancing more accurate computational-workflow environment recommendations.

In some embodiments, the system may determine data dependencies between the operations of the computational-workflow. For example, the system may extract metadata from each operation of the set of operations of the computational-workflow. For example, each operation may be associated with metadata that indicates expected input and output data formats, structures, or other computational or data-related requirements for each operation of the computational workflow. For instance, as the final output of a given operation may be used as an input of another operation, the system may determine how data of one operation depends on another operation. Leveraging such information is advantageous as the system can determine data-level operational dependencies among each operation (e.g., task) within a given workflow to ensure that data-dependency requirements are being satisfied.

Furthermore, the system may use the data-dependency information to provide recommendations as to which execution engine should execute a given workflow based on (i) the data formats involved with the computational workflow and (ii) the data formats associated with execution engines (e.g., which data formats, types, schemas, the execution engine is able to handle). Therefore, determining data dependencies involved in the computational workflow may aid generation of execution engine recommendations as execution engines may depend on particular data dependencies.

To determine such data dependencies, the system may parse the extracted metadata to determine an input specification and an output specification for each operation of the set of operations (e.g., of a computational-workflow). The input specification may indicate a required or expected input data format, input data length (e.g., size), input data time (e.g., an expected time at which the operation is to receive data), an input data source (e.g., a streaming input data source, a fixed input data source, a database, etc.), input data type, or other input data-related specification. The output specification may indicate a required or expected output data format, output data length (e.g., size), output data time (e.g., an expected time at which the operation is to output data), an output data type, or other output data-related specification. The input and output specifications may be identifiable via one or more identifiers (e.g., tags, labels, etc.) that indicate the input or output specifications, where the parsing identifies or extracts the input and output specifications based on the respective identifiers.

The system may then identify, for a first operation of the set of operations, a second operation of the set of operations, based on the architecture of the computation-workflow (e.g., via the links, such as links 103*a*-103*f* (FIG. 1), that is configured to be executed based on an execution of the first operation. For example, the system may determine a first operation and a second operation of the computational-workflow that are "linked" or otherwise connected to each other where the first operation provides data to the second operation. For example, the first operation may provide output data to the second operation as input. In some embodiments, the first operation may provide output data (e.g., from the first operation) to the second operation to be received as input at the section operation based on a successful execution of the first operation. Additionally or alternatively, the first operation may provide data to the second operation based on various other triggers such as a given time, season, execution of another operation, upon receiving data, or other trigger. As such, the system may determine the first operation and the second operation based on the architecture of the computational-workflow. The system may then determine a first operational dependency of the set of operational dependencies using the output specification of the first operation and the input specification of the second operation.

For example, the system may generate a first operational dependency that defines the data dependency between the first operation and the second operation by indicating the output specification of the first operation and the input specification of the second operation. In this way, data dependencies among the operations within a computational-workflow may be determined to generate more accurate and robust recommendations for executing the computational-workflow on data-dependent execution engines.

In some embodiments, the system may perform multiple iterations of determining data dependencies among the operations of the computational-workflow until each input/output combination of the computational workflow, with respect to the computational-workflow's architecture, has been considered. In this way, the system may generate a set of data dependencies for the computational-workflow, which may generate more accurate and robust workflow engine recommendations.

In some embodiments, the system may determine computational resource dependencies for the computational-workflow. For example, the system may extract metadata from each operation of the set of operations of the computational-workflow. Each operation of the computational-workflow may be associated with metadata that indicates an amount of computer processor requirements, a language (e.g., computing language), memory requirements (e.g., size, memory read-write speeds, memory types, memory allocation, etc.), an amount of available network bandwidth, an indication of a Graphical Processing Unit boost, ability to parallelized with other operations, security requirements (e.g., encryption standards, encryption formats, encryption protocols), or other computational resource related requirements for a given operation (e.g., task, job, etc.). Each requirement may be associated with its own metadata identifier identifying the computational requirements for a particular operation. For example, a first operation may include labeled metadata of "Language: Java," "CPU: 2.2 GHZ," "Memory: 2 Gb," "Encryption: RSA" where Language, CPU, Memory, and Encryption are the identifiers, and Java, 2.2, 2, and RSA are the values (e.g., for attribute value pairs). Leveraging such computational resource dependency information, the system may provide recommendations as to which execution engine should execute the computational-workflow.

To determine such computational resource dependencies, the system may parse the extracted metadata to determine a set of computational resource requirements. For example, the system may parse the extracted metadata for identifiers indicating the set of computational resource requirements. In some embodiments, the system may parse the metadata for the computational resource requirement identifiers by direct string matching between the metadata identifiers and a set of known computational resource requirement identifiers. In other embodiments, the system may use Natural Language Processing or other identification process to determine the set of computational resource requirements for each operation of the set of operations.

The system may then determine a first operational dependency for each operation of the set of operations using the determined set of computational resource requirements. For example, the first operational dependency may indicate the set of computational resource requirements for an operation. As differing computational-workflows may face incompatibility with particular workflow engines (e.g., due to the computational requirements associated with the computational-workflow and a workflow engine to execute the computational-workflow), the system may determine computational resource dependencies for each operation of the set of operations for the computational-workflow to provide workflow execution engine (e.g., workflow environment) recommendations. In this way, the system may generate more accurate workflow engine/workflow environment recommendations by ensuring that the workflow is compatible with a recommended workflow engine.

In some embodiments, the system may filter the computational requirements for each of the operations based on a minimum or a maximum. For example, to reduce the amount of computational resources required for a machine learning model to generate a prediction (e.g., as will be explained later), the system may reduce the size of the input data set by filtering the computational requirements based on a minimum of maximum value. For example, in accordance with one or more embodiments, the system may determine which operation of the set of operations has the highest memory requirement than all the other operations. Upon determining which operation has the highest memory requirement, the system may remove (or otherwise delete) information corresponding to the memory requirements of the other operations (e.g., since the operation that requires the most memory acts as a controlling variable when selecting a workflow execution engine). Additionally or alternatively, the system may filter all applicable computational resource requirements for each of the operations based on a minimum or maximum, thereby generating a single computational resource requirement dependency that reflects the minimums or maximums of each operation of the set of operations in the computational workflow-thereby conserving computational resources when (i) determining the set of operational dependencies and (ii) generating a recommendation for a computational-workflow engine/environment.

In some embodiments, the system may determine execution dependencies for the computational-workflow. For example, the system may extract metadata from each operation of the set of operations of the computational-workflow. Each operation of the computational-workflow may be associated with metadata that indicates one or more execution constraints. The execution constraints may refer to a condition under which a given operation should be executed. For example, an operation may indicate a time at which the operation should be executed (e.g., date, time, period of time, etc.), what input data needs to be received at the operation before the operation may process the input data, an amount of input data that the operation requires to effectively process the input data, a size of input data that the operation required to effectively process the input data, an input (e.g., user input, automatic input, etc.) required before output data of the operation may be passed to another operation, or other execution constraints.

Each execution constraint may be associated with its own metadata identifier identifying the execution constraints for a particular operation. For example, a first operation may include labeled metadata of "Schedule: Hourly, Size: 2 Mb" where Schedule and Size are the identifiers, and Hourly and 2 Mb are the values (e.g., for attribute value pairs).

To determine a set of operational dependencies, the system may parse the extracted metadata to determine a set of execution constraints. For example, the system may parse the extracted metadata for identifiers indicating the set of execution constraints. In some embodiments, the system may parse the metadata for the computational resource requirement identifiers by direct string matching between the metadata identifiers and a set of known execution constraint identifiers. In other embodiments, the system may use Natural Language Processing or other identification process to determine the set of execution constraint identifiers for each operation of the set of operations.

The system may then determine a first operational dependency for each operation of the set of operations using the determined set of execution constraints. For example, the first operational dependency may indicate the set of execution constraints for an operation. As execution constrains have influence as to whether computational workflows are scalable (e.g., ensuring that execution schedules line up with other processes, that operations have their required data), selecting a workflow environment that is suitable for the computational workflow may depend on the execution constraints. As such, by determining the set of execution constraints, the system may generate more accurate workflow engine/workflow environment recommendations to execute the computational-workflow.

In some embodiments, the system may determine a priority of each operation of the set of operations for the computational-workflow. For example, the system may extract metadata from each operation of the set of operations of the computational-workflow. Each operation of the computational-workflow may be associated with metadata that indicates a priority of the operation. The priority may indicate a level of priority (e.g., integer, ratio, decimal, alphanumeric, character, etc.). For instance, a level of priority may indicate how important the operation is to execute. As an example, an operation with a high priority may be caused to execute before other operations may execute irrespective of time-dependent or scheduled operations. As execution environments, or execution engines, may or may not have the ability to prioritize operations over other operations, determining whether the computational-workflow includes operations with priority values may be important to determine when recommending a computational-workflow environment or computational-workflow engine.

To determine a set of operational dependencies, the system may parse the extracted metadata to determine a set of priorities of the operations. For example, the system may parse the extracted metadata for identifiers indicating a priority of each operation of the set of operations of the computational-workflow. In some embodiments, the system may parse the metadata for the computational resource requirement identifiers by direct string matching between the metadata identifiers and a set of known priority identifiers. In other embodiments, the system may use Natural Language Processing or other identification process to determine the set of priority identifiers for each operation of the set of operations.

The system may then determine a first operational dependency for each operation of the set of operations using the determined set of priorities of the operations. For example, the first operational dependency may indicate a priority of an operation (or all operations). In this way, the system may generate more accurate workflow engine/workflow environment recommendations as workflow environments/engines may depend on whether they are able to process priorities of operations.

In some embodiments, the system may determine historical execution data of each operation of the set of operations of the computational-workflow. For example, the system may extract metadata from each operation of the set of operations to determine an identifier for each operation of the set of operations. The system may then retrieve a set of historical execution data for each operation of the set of operations from a database storing historical execution data of operations associated with computational-workflows using the determined identifiers. For instance, the system may query a database using an identifier associated with an operation. Upon determining a match between the identifier associated with the operation (e.g., of the computational-workflow) and other identifiers indicating the operation from the database, the system may retrieve historical execution data for that operation from the database. The historical execution data may indicate past successes, failures, execution times, computational resource utilization (e.g., CPU amounts, allocated memory values, etc.), errors, or other execution data. Such historical execution data is advantageous to retrieve (and provide to a machine learning model when recommending computational workflow environments/engines) to ensure compatibility between the operations of the workflow and the environment/engines in which they execute.

As an example, where an operation is determined to historically emit one or more errors, a given execution engine may be incompatible with handling a given error type. As another example, where an operation is historically known to use a certain amount of memory, a computational-workflow engine or computational workflow-environment must be able to provide such memory resources to the given operation. As such, accessing historical execution data may be advantageous to select the most efficient computational-workflow engine. Additionally, by accessing such historical execution data, the system may verify whether one or more execution constraints or resource requirements (e.g., as indicated in the metadata associated with the operation of the computational workflow) is accurate-thereby ensuring that input data to the machine learning model is verified prior to generating a recommendation for a computational-workflow environment or computational-workflow engine. Thus, the system may determine a first operational dependency for each operation of the set of operations using the retrieved historical execution data.

In some embodiments, the system may determine owners of each operation of the set of operations of the computational-workflow. For example, the system may extract metadata from each operation of the set of operations to determine an identifier for each operation of the set of operations. The system may then retrieve an owner for each operation of the set of operations from a database storing ownership information of operations associated with computational-workflows using the determined identifiers. For instance, the system may query a database using an identifier associated with an operation. Upon determining a match between the identifier associated with the operation (e.g., of the computational-workflow) and other identifiers indicating the operation from the database, the system may retrieve an owner for that operation from the database. The owner (and ownership information) may indicate an entity, user, corporation, website, or other owner of the operation. For example, the owner of an operation may be a managing entity of that operation that has access to the source code that processes information provided to that operation. For instance, where an operation is an API (or to provide data to an API), the API may be associated with an owner that is a third-party to the entity that is implementing the computational-workflow (e.g., where a first entity "owns" the computational workflow, however, provides data from an operation of the computational-workflow to another operation that is owned by another owner).

Such ownership information of operations is advantageous to retrieve (and provide to a machine learning model when recommending computational workflow environments/engines) to ensure compatibility between the operations of the workflow and the environment/engines in which they execute. As an example, due to the nature of workflow environments having different capabilities, features, and so forth, ensuring that a computational-workflow environment is capable of transmitting data outside its environment may effect whether that computational workflow environment is suitable for the given computational-workflow itself. The system may then determine a first operational dependency for each operation of the set of operations using the retrieved owners. In this way, the system may verify compatibility among the computational-workflow and computational-workflow environments/engines, thereby providing better and more accurate recommendations.

In some embodiments, the system may determine a version of each operation of the set of operations for the computational-workflow. For example, the system may extract metadata from each operation of the set of operations of the computational-workflow. Each operation of the computational-workflow may be associated with metadata that indicates a version of the operation. The version may indicate a software version of the operation, a change log information, update information, timestamps of updates, or other versioning information of the operation. For instance, the version may indicate what software version the operation is using or what time the operation was last updated. Versioning information of the operations of the computational-workflow is beneficial to consider when selecting or recommending computational-workflow engines as the versioning information of one or more operations may impact the compatibility of a computational-workflow environment or engine. For instance, certain computational-workflow environments may only be configured to execute operations of a given version, software language, or other factor. Therefore, by determining a version for each operation of the set of operations, the system may provide better and more accurate recommendations of computational-workflow environments to execute the computational-workflow.

As such, the system may the system may parse the extracted metadata to determine a set of versions associated with the operations. For example, the system may parse the extracted metadata for identifiers indicating a version of each operation of the set of operations of the computational-workflow. In some embodiments, the system may parse the metadata for the version identifiers by direct string matching between the metadata identifiers and a set of known version identifiers. In other embodiments, the system may use Natural Language Processing or other identification process to determine the set of version identifiers for each operation of the set of operations.

The system may then determine a first operational dependency for each operation of the set of operations using the determined versions of the operations. For example, the first operational dependency may indicate a version of an operation (or all operations). In this way, the system may generate more accurate workflow engine/workflow environment recommendations as workflow environments/engines may depend on whether they are able to process particular versions of operations.

At step 406, process 400 (e.g., using one or more components described above) generates a feature vector. For example, the system may generate a feature vector comprising the set of operational dependencies and an identifier associated with the computational-workflow environment to be inputted into a machine learning model configured to generate a first recommendation indicating another computational-workflow environment to execute the computational-workflow. For example, the feature vector may include a normalized representation of the operational dependencies by providing the set of operational dependencies to an embedding model, well as the identifier associated with the computational-workflow environment (e.g., that is currently executing, or configured to execute/host the computational-workflow). As an example, the generated feature vector may be the same as or similar to feature vector 216 (FIG. 2).

The machine learning model may be trained on historical data indicating computational-workflows executed within disparate computational-workflow environment (e.g., workflow engines) that are associated with the first entity (e.g., the entity associated with the computational-workflow). For example, to reduce deployment time and incompatibility errors between the computational-workflow and deploying computational-workflows to computational-workflow environments, the system may provide the feature vector to a machine learning model to generate a computational-workflow environment recommendation. As the machine learning model is trained on historical data indicating computational-workflows that are executed within computational-workflow environments that are associated with the first entity, the machine learning model may recommend computational-workflow environments that are already configured to interact with one or more operational components of a the computational-workflow. That is, because the machine learning model is trained on historical computational-workflows that are specific to the entity, the system may select the most suitable computational-workflow environment that is currently "set up" to accept computational-workflows to be deployed to. This in turn reduces computational-workflow deployment time as developers need not configure a new computational-workflow environment, and may use already configured computational-workflow environments. Additionally, in this way, the system may further reduce the usage of computational resources (e.g., computer memory and processing power) when scaling a computational-workflow to a new computational-workflow environment as recommended computational-workflow environments are pre-configured to interact with operational components of the computational-workflow.

When the system provides the feature vector as input to the machine learning model (e.g., that is trained on computational-workflows that are executed within computational-workflow environments that are associated with the entity), the system may generate a recommendation as to which computational-workflow environment that the computational-workflow should be hosted or executed within. As discussed above, the feature vector may be a normalized representation of the operational dependencies of each operation of the computational-workflow, the architecture of the computational-workflow, and an indication of which computational-workflow environment that the computational-workflow is to be executed in. The vectorized (e.g., normalized) representation enables the machine learning model to discover relationships between the features (e.g., the operational dependencies and the architecture of the computational-flow, as well as the features offered by the computational-workflow environment itself) to provide a recommendation as to which computational-workflow environment the computational-workflow should be executed within.

To do so, the system may generate a vector embedding of the set of operational dependencies. For example, where operational dependencies may be expressed in varying formats (e.g., strings, alphanumeric, integers, characters, ratios, decimals, etc.), the system normalizes the operational dependencies to enable a machine learning model to understand the operational dependencies more efficiently. As such, the system may provide the set of generated operation dependencies for the computational-workflow to an embedding model to generate a vector embedding of the set of operation dependencies. For example, the embedding model may be any embedding model, such as BERT, Word2Vec, etc.

The system may then generate the feature vector based on the vector embedding. For example, the system may generate a set of vector embeddings for each operational dependency. The system may then aggregate the set of vector embeddings to form a one dimensional, two dimensional, three dimensional, . . . 100 dimensional, . . . and so on, feature vector. In some embodiments, in response to generating the feature vector based on the vector embedding, the system may provide the generated feature vector to the machine learning model to generate a computational-workflow environment recommendation. In this way, by generating the feature vector, the machine learning model may efficiently process the set of operational dependencies that may be expressed in differing data formats.

In some embodiments, the feature vector may additionally include features of the computational-workflow environment itself. For example, to overcome the technical deficiencies of existing systems having no mechanism to adapt to ever-changing computational-workflow needs, the system may incorporate a vectorized representation of the features offered by the computational-workflow environment of the computational-workflow to enhance computational-workflow environment recommendations. For instance, as the operations of a computational-workflow may require particular features that a computational-workflow environment offers (e.g., error monitoring, testing, etc.), the system can recommend computational-workflow environments to execute the computational-workflow further in view of the availability of particular computational-workflow environment features-thereby generating more accurate and robust computational-workflow environment recommendations, as well as reducing the likelihood of wasted computational resources when computational-workflows are inadvertently deployed to incompatible environments.

In some embodiments, the system may retrain the machine learning model. For instance, to ensure that the system generates the most accurate computational-workflow environment recommendations, the system may automatically update the machine learning model with new data. For example, the system may trigger an update routine to be performed on the machine learning model in response to detecting that the entity has deployed a computational workflow to a computational-workflow environment.

The system may detect that a second computational workflow associated with the entity has been deployed to execute within a third computational-workflow environment. For instance, the system may monitor for new updates or publications of computational-workflows that are associated with the entity to computational-workflow environments. By monitoring such updates or publications with respect to the entity, the system may ensure that the machine learning model is updated with the latest information-thereby enabling generation of the most accurate and robust computational-environment/engine recommendations.

In some embodiments, the update routine may be performed on the machine learning model in response to updating the historical data. For example, the system may first update the historical data (e.g., to which the machine learning model was previously trained on) with an indication that the detected computational-workflow associated with the entity has been deployed to execute within a particular computational-workflow environment. In this way, the system may verify that the training data has been updated prior to retraining the machine learning model.

At step 408, process 400 (e.g., using one or more components described above) receives a first recommendation indicating a computational-workflow environment. For example, the system may receive the first recommendation from the machine learning model indicating the second (e.g., other) computational-workflow environment to execute the first computational-workflow. For instance, the system may generate for display, via a graphical user interface, the first recommendation that indicates a recommended computational-workflow environment that should execute (or otherwise host) the computational-workflow. By doing so, the system may then provide to a user the recommended computational-workflow environment that is best suited to execute the computational-workflow.

At step 410, process 400 (e.g., using one or more components described above) deploys the computational-workflow to the computational-workflow environment. For example, the system may deploy the first computational-workflow within the second computational-workflow environment. For instance, the system may provide the computational-workflow to the newly recommended computational-workflow environment to be deployed for use. As an example, the system may transmit the computational-workflow to an address associated with a computing system component (e.g., of FIG. 3) that may host the computational-workflow. For instance, the address may be an IP address, a web-server address, a URL, or other computer address that is configured to receive data. The system may package the computational-workflow and transmit the packaged computational-workflow to the computing system component hosting the recommended computational-workflow environment to execute the computational-workflow. In this way, for example, the system may deploy computational-workflows to disparate systems (e.g., to scale the computational-workflow, to redirect the computational-workflow, to transfer the computational-workflow) that are associated with the entity, thereby reducing computational-workflow downtime.

In some embodiments, the system can generate a computational-workflow. For example, the system can generate, based on a computing language associated with the second computational-workflow environment (e.g., the recommended computational-workflow environment that the computational-workflow is to be deployed to), a second computational-workflow that corresponds to the first computational-workflow (e.g., the original computational-workflow) that is configured to be executed within the second computational-workflow environment. For example, the system may extract a computing-language identifier associated with the second computational-workflow environment. For instance, as described above, each computational-workflow environment may be written in a given computing language (e.g., C++, Ruby, C#, Python, Java, etc.). For computational-workflows to properly execute within the computational-workflow environment, the computational-workflows must be written in a computing language that is the same as the computational-workflow environment in which the computational-workflow is to be deployed to. To reduce computational-workflow errors caused by incompatibility between computing languages of the workflow and the environment in which they execute, the system may generate a new version of the computational-workflow that is written in a computing language corresponding to the recommended computational-workflow environment.

To do so, the system may extract the set of operations from the computational-workflow and architecture information of the architecture of the computational-workflow. The system may access a database storing pre-generated code portions that are environmentally agnostic (e.g., engine agnostic). For example, the pre-generated code portions that are environmentally agnostic may be pseudo code that corresponds to operations of the computational-workflow, however, are not written in a particular language. Leveraging such environment agnostic code portions, the system can transform each operation of the set of operations of the computational-workflow into a pseudo code version of the operation. For instance, the system may extract the metadata of an operation and replace one or more null values of a corresponding pseudo code portion. Each code portion of the environmentally agnostic pre-generated code portions may correspond to an operation that computational-workflows can use with null "placeholder values." For example, a code portion of the environmentally agnostic pre-generated code portions may be for a "retrieve" operation. The "retrieve" operation may be associated with characteristics such as a data type (e.g., indicating what type/format of data to retrieve), a location (e.g., a location to retrieve the data from), and a threshold time value (e.g., a time indicating what time to quit execution of the operation). Each characteristic may include a placeholder value (e.g., a null value) to enable the placeholder values to be supplemented with data corresponding to the operation of the computational-workflow. The advantage of using such pseudo code portions with null values is that every computing language, computational-workflow operation, and computational-workflow environment may utilize different values when generating an executable version of the computational-workflow operation at compile time/run time. Therefore, by leveraging such pseudo code portions, the system can import (e.g., replace) only those null values of the pseudo code that are applicable to a given computing language of the computational-workflow environment to generate a corresponding computational-workflow that is deployable to a variety of computational-workflow environments utilizing different computing languages other than what the computational-workflow was originally written in.

The system can extract the metadata from each operation of the set of operations and identify an operation identifier of the operation (e.g., of the computational-workflow). Using the operation identifier, the system identifies an environmentally agnostic pre-generated code portion that corresponds to the operation (e.g., of the computational-workflow). The system may then replace corresponding null values of the environmentally agnostic pre-generated code portion with metadata of the operation (e.g., of the computational-workflow). For example, corresponding null values may be based on a matching between metadata identifiers of (i) the operation and (ii) the environmentally agnostic pre-generated code portion. By doing so, the system may generate an environmentally agnostic, pseudo code version of each operation of the set of operations based on the null-value replaces environmentally agnostic pre-generated code portions. In some embodiments, the system may store the environmentally agnostic, pseudo code version of each operation of the set of operations in a database for future use (e.g., to reduce a waste in computational resources if the computational-workflow is to be executed in a different computational-workflow environment in the future).

The system may then use the environmentally agnostic, pseudo code version of each operation of the set of operations to generate an updated version of the computational-workflow that can be executed within the recommended computational-workflow environment. For example, the system may access a database storing executable versions of the pseudo code versions of each operation. For example, the executable versions of the pseudo code versions may be written in a variety of computing languages to enable reuse of such executable versions, which in turn, reduces computational-workflow downtime caused by manual writing of code. The system may use a computing language identifier of the recommended computational-workflow environment to identify an executable version of the pseudo code to extract for use. For instance, the system may extract, from the database, the executable version of the pseudo code version of the operation that is in the computing language of the recommended computational-workflow environment. The system may repeat this process for each operation of the set of operations of the computational-workflow to generate an executable version of the computational-workflow that is in the computing language of the computational-workflow environment (e.g., a translated version of the computational-workflow). The system may then deploy the translated version of the computational-workflow to the second computational-workflow environment (e.g., the recommended computational-workflow environment). In this way, the system may reduce computational-workflow downtime as developers need not re-write computational-workflows in differing computing languages, but may rather leverage the reusable code portions to efficiently generate translated computational-workflows for a variety of computational-workflow environments.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving a computational-workflow comprising a set of operations that are coordinated to be performed based on a execution trigger of an operation, wherein the computational-workflow is configured to execute within a first computational-workflow environment; determining a set of operational dependencies for the computational-workflow based on (i) an architecture of the computational-workflow and (ii) the set of operations; generating a feature vector comprising the set of operational dependencies and an identifier associated with the first computational-workflow environment to be inputted into a machine learning model configured to generate a first recommendation indicating a second computational-workflow environment to execute the first computational-workflow; receiving the first recommendation from the machine learning model indicating the second computational-workflow environment to execute the first computational-workflow; and deploying the first computational-workflow within the second computational-workflow environment.
2. The method of any one of the preceding embodiments, wherein deploying the first computational-workflow within the second computational-workflow environment further comprises: generating, based on a language associated with the second computational-workflow environment, a second computational-workflow corresponding to the first computational-workflow that is configured to be executed within the second computational-workflow environment; and deploying the second computational-workflow to the second computational-workflow environment.
3. The method of any one of the preceding embodiments, wherein determining the set of operational dependencies for the computational-workflow further comprises: extracting metadata from each operation of the set of operations of the computational-workflow; parsing the extracted metadata to determine an input specification and an output specification for each operation of the set of operations; identifying, for a first operation of the set of operations, a second operation of the set of operations, based on the architecture of the computational-workflow, that is configured to be executed based on an execution of the first operation; identifying an input specification for the second operation; and determining a first operational dependency of the set of operational dependencies using the output specification of the first operation and the input specification of the second operation.
4. The method of any one of the preceding embodiments, wherein determining the set of operational dependencies for the computational-workflow further comprises: extracting metadata from each operation of the set of operations of the computational-workflow; parsing the extracted metadata to determine a set of computational resource requirements for each operation of the set of operations; and determining a first operational dependency for each operation of the set of operations using the determined set of computational resource requirements.
5. The method of any one of the preceding embodiments, wherein determining the set of operational dependencies for the computational-workflow further comprises: extracting metadata from each operation of the set of operations of the computational-workflow; parsing the extracted metadata to determine a set of execution constraints for each operation of the set of operations; and determining a first operational dependency for each operation of the set of operations using the determined set of execution constraints.
6. The method of any one of the preceding embodiments, wherein determining the set of operational dependencies for the computational-workflow further comprises: extracting metadata from each operation of the set of operations of the computational-workflow; parsing the extracted metadata to determine a priority for each operation of the set of operations; and determining a first operational dependency for each operation of the set of operations using the determined priority.
7. The method of any one of the preceding embodiments, wherein determining the set of operational dependencies for the computational-workflow further comprises: extracting metadata from each operation of the set of operations of the computational-workflow; parsing the extracted metadata to determine an identifier for each operation of the set of operations; retrieving a set of historical execution data for each operation of the set of operations from a database storing historical execution data of operations associated with computational-workflows using the determined identifiers; and determining a first operational dependency for each operation of the set of operations using the retrieved historical execution data.

8. The method of any one of the preceding embodiments, wherein determining the set of operational dependencies for the computational-workflow further comprises: extracting metadata from each operation of the set of operations of the computational-workflow; parsing the extracted metadata to determine an identifier for each operation of the set of operations; retrieving an owner for each operation of the set of operations from a database storing ownership information of operations associated with computational-workflows using the determined identifiers; and determining a first operational dependency for each operation of the set of operations using the retrieved owners.

9. The method of any one of the preceding embodiments, wherein determining the set of operational dependencies for the computational-workflow further comprises: extracting metadata from each operation of the set of operations of the computational-workflow; parsing the extracted metadata to determine a version for each operation of the set of operations; and determining a first operational dependency for each operation of the set of operations using the determined version.

10. The method of any one of the preceding embodiments, wherein the machine learning model is trained on historical data indicating computational-workflows executed within disparate computational-workflow engines associated with a first entity.

11. The method of any one of the preceding embodiments, further comprising: detecting that a second computational-workflow associated with the entity has been deployed to execute within a third computational-workflow environment; updating the historical data with an indicating that the second computational-workflow associated with the first entity has been deployed to execute within the third computational-workflow environment; and in response to updating the historical data, performing an update routine on the machine learning model.

12. The method of any one of the preceding embodiments, wherein generating the feature vector further comprises: providing the set of operational dependencies for the computational-workflow to an embedding model to generate a vector embedding of the set of operational dependencies; and generating the feature vector based on the vector embedding.

13. A tangible, non-transitory, machine-readable medium storing instructions that, when executed by a data processing apparatus, cause the data processing apparatus to perform operations comprising those of any of embodiments 1-12.

14. A system comprising one or more processors; and memory storing instructions that, when executed by the processors, cause the processors to effectuate operations comprising those of any of embodiments 1-12.

15. A system comprising means for performing any of embodiments 1-12.

What is claimed is:

1. A system for reducing usage of computational resources associated with scaling computational-workflows to disparate execution engines via engine-agnostic computational-workflow engine recommendations, the system comprising:

one or more processors and memories storing instructions that, when executed by the one or more processors, cause operations comprising:

receiving a computational-workflow comprising a set of operations that are coordinated to be performed based on an execution trigger associated with at least one operation of the set of operations, wherein the computational-workflow is configured to execute within a first computational-workflow engine associated with an entity;

extracting the set of operations from the computational-workflow;

determining, for each operation of the set of operations, a set of operational dependencies for the computational-workflow based on (i) an architecture of the computational-workflow and (ii) the set of operations;

generating a feature vector comprising the sets of operational dependencies and an identifier associated with the first computational-workflow engine to be inputted into a machine learning model configured to generate a first recommendation indicating a second computational-workflow engine to execute the computational-workflow, wherein the second computational-workflow engine is associated with the entity, and wherein the machine learning model is trained on historical data indicating computational-workflows executed within disparate computational-workflow engines associated with the entity;

inputting the feature vector to the machine learning model;

receiving the first recommendation indicating the second computational-workflow engine that is associated with the entity to execute the computational-workflow;

generating, based on a computing language associated with the second computational-workflow engine, a second computational-workflow corresponding to the computational-workflow that is configured to be executed within the second computational-workflow engine; and deploying the second computational-workflow to the second computational-workflow engine.

2. A method for reducing usage of computational resources associated with scaling computational-workflows to disparate execution engines via engine-agnostic computational-workflow engine recommendations, the method comprising:

receiving a computational-workflow comprising a set of operations that are coordinated to be performed based on an execution trigger of an operation of the set of operations, wherein the computational-workflow is configured to execute within a first computational-workflow environment associated with an entity;

determining a set of operational dependencies for the computational-workflow based on (i) an architecture of the computational-workflow and (ii) the set of operations;

generating a feature vector comprising the set of operational dependencies and an identifier associated with the first computational-workflow environment to be inputted into a machine learning model configured to generate a first recommendation indicating a second computational-workflow environment to execute the computational-workflow, wherein the second computational-workflow environment is associated with the entity, and wherein the machine learning model is trained on historical data indicating computational-workflows executed within disparate computational-workflow environments associated with the entity;

inputting the feature vector into the machine learning model;

receiving the first recommendation from the machine learning model indicating the second computational-workflow environment to execute the computational-workflow; and deploying a second computational-workflow, corresponding to the computational-workflow, to the second computational-workflow environment, wherein the second computational-workflow is in a computing language associated with the second computational-workflow environment.

3. The method of claim 2, wherein deploying the second computational-workflow within the second computational-workflow environment further comprises:

generating, based on the computing language associated with the second computational-workflow environment, the second computational-workflow corresponding to the computational-workflow that is configured to be executed within the second computational-workflow environment; and deploying the second computational-workflow to the second computational-workflow environment.

4. The method of claim 2, wherein determining the set of operational dependencies for the computational-workflow further comprises:

extracting metadata from each operation of the set of operations of the computational-workflow;

parsing the extracted metadata to determine an input specification and an output specification for each operation of the set of operations;

identifying, for a first operation of the set of operations, a second operation of the set of operations, based on the architecture of the computational-workflow, that is configured to be executed based on an execution of the first operation;

identifying an input specification for the second operation; and determining a first operational dependency of the set of operational dependencies using the output specification of the first operation and the input specification of the second operation.

5. The method of claim 2, wherein determining the set of operational dependencies for the computational-workflow further comprises:

extracting metadata from each operation of the set of operations of the computational-workflow;

parsing the extracted metadata to determine a set of computational resource requirements for each operation of the set of operations; and determining a first operational dependency for each operation of the set of operations using the determined set of computational resource requirements.

6. The method of claim 2, wherein determining the set of operational dependencies for the computational-workflow further comprises:

extracting metadata from each operation of the set of operations of the computational-workflow;

parsing the extracted metadata to determine a set of execution constraints for each operation of the set of operations; and determining a first operational dependency for each operation of the set of operations using the determined set of execution constraints.

7. The method of claim 2, wherein determining the set of operational dependencies for the computational-workflow further comprises:

extracting metadata from each operation of the set of operations of the computational-workflow;

parsing the extracted metadata to determine a priority for each operation of the set of operations; and determining a first operational dependency for each operation of the set of operations using the determined priority.

8. The method of claim 2, wherein determining the set of operational dependencies for the computational-workflow further comprises:

extracting metadata from each operation of the set of operations of the computational-workflow;

parsing the extracted metadata to determine an identifier for each operation of the set of operations;

retrieving a set of historical execution data for each operation of the set of operations from a database storing historical execution data of operations associated with computational-workflows using the determined identifiers; and determining a first operational dependency for each operation of the set of operations using the retrieved historical execution data.

9. The method of claim 2, wherein determining the set of operational dependencies for the computational-workflow further comprises:

extracting metadata from each operation of the set of operations of the computational-workflow;

parsing the extracted metadata to determine an identifier for each operation of the set of operations;

retrieving an owner for each operation of the set of operations from a database storing ownership information of operations associated with computational-workflows using the determined identifiers; and determining a first operational dependency for each operation of the set of operations using the retrieved owners.

10. The method of claim 2, wherein determining the set of operational dependencies for the computational-workflow further comprises:

extracting metadata from each operation of the set of operations of the computational-workflow;

parsing the extracted metadata to determine a version for each operation of the set of operations; and determining a first operational dependency for each operation of the set of operations using the determined version.

11. The method of claim 2, further comprising:

detecting that a third computational-workflow associated with the entity has been deployed to execute within a third computational-workflow environment;

updating the historical data with an indicating that the third computational-workflow associated with the entity has been deployed to execute within the third computational-workflow environment; and in response to updating the historical data, performing an update routine on the machine learning model.

12. The method of claim 2, wherein generating the feature vector further comprises:

providing the set of operational dependencies for the computational-workflow to an embedding model to generate a vector embedding of the set of operational dependencies; and generating the feature vector based on the vector embedding.

13. One or more non-transitory, computer-readable media storing instructions that, when executed by one or more processors, cause operations comprising:

receiving a computational-workflow comprising a set of operations configured to execute within a first computational-workflow environment associated with an entity;

determining a set of operational dependencies for the computational-workflow based on (i) an architecture of the computational-workflow and (ii) the set of operations;

generating a feature vector comprising the set of operational dependencies and an identifier associated with the first computational-workflow environment to be inputted into a machine learning model configured to generate a first recommendation indicating a second computational-workflow environment to execute the computational-workflow, wherein the second computational-workflow environment is associated with the entity, and wherein the machine learning model is trained on historical data indicating computational-workflows executed within disparate computational-workflow environments associated with the entity;

inputting the feature vector into the machine learning model;

receiving the first recommendation from the machine learning model indicating the second computational-workflow environment to execute the computational-workflow; and deploying a second computational-workflow, corresponding to the computational-workflow, to the second computational-workflow environment, the second computational-workflow being configured to be executed within the second computational-workflow environment.

14. The media of claim 13, wherein deploying the first second computational-workflow within the second computational-workflow environment further comprises:

generating, based on a computing language associated with the second computational-workflow environment, the second computational-workflow corresponding to the first computational-workflow that is configured to be executed within the second computational-workflow environment; and deploying the second computational-workflow to the second computational-workflow environment.

15. The media of claim 13, wherein determining the set of operational dependencies for the computational-workflow further comprises:

extracting metadata from each operation of the set of operations of the computational-workflow;

parsing the extracted metadata to determine an input specification and an output specification for each operation of the set of operations;

identifying, for a first operation of the set of operations, a second operation of the set of operations, based on the architecture of the computational-workflow, that is configured to be executed based on an execution of the operation;

identifying an input specification for the second operation; and determining a first operational dependency of the set of operational dependencies using the output specification of the operation and the input specification of the second operation.

16. The media of claim 13, wherein determining the set of operational dependencies for the computational-workflow further comprises:

extracting metadata from each operation of the set of operations of the computational-workflow;

parsing the extracted metadata to determine a set of computational resource requirements for each operation of the set of operations; and determining a first operational dependency for each operation of the set of operations using the determined set of computational resource requirements.

17. The media of claim 13, wherein determining the set of operational dependencies for the computational-workflow further comprises:

extracting metadata from each operation of the set of operations of the computational-workflow;

parsing the extracted metadata to determine an identifier for each operation of the set of operations;

retrieving a set of historical execution data for each operation of the set of operations from a database storing historical execution data of operations associated with computational-workflows using the determined identifiers; and determining a first operational dependency for each operation of the set of operations using the retrieved historical execution data.

18. The media of claim 13, the instructions further causing operations comprising:

detecting that a third computational-workflow associated with the entity has been deployed to execute within a third computational-workflow environment;

updating the historical data with an indicating that the third computational-workflow associated with the entity has been deployed to execute within the third computational-workflow environment; and in response to updating the historical data, performing an update routine on the machine learning model.

19. The media of claim 13, wherein determining the set of operational dependencies for the computational-workflow further comprises:

extracting metadata from each operation of the set of operations of the computational-workflow;

parsing the extracted metadata to determine a set of execution constraints for each operation of the set of operations; and determining a first operational dependency for each operation of the set of operations using the determined set of execution constraints.

20. The media of claim 13, wherein determining the set of operational dependencies for the computational-workflow further comprises:

extracting metadata from each operation of the set of operations of the computational-workflow;

parsing the extracted metadata to determine a version for each operation of the set of operations; and determining a first operational dependency for each operation of the set of operations using the determined version.

* * * * *